United States Patent
Shchygel

(10) Patent No.: US 10,748,245 B1
(45) Date of Patent: *Aug. 18, 2020

(54) SCALING A FIXED FONT USED BY A FIRMWARE INTERFACE

(71) Applicant: American Megatrends International, LLC, Norcross, GA (US)

(72) Inventor: Artem Shchygel, Lawrenceville, GA (US)

(73) Assignee: American Megatrends International, LLC, Norcross, GA (US)

(*) Notice: Subject to any disclaimer, the term of this patent is extended or adjusted under 35 U.S.C. 154(b) by 7 days.

This patent is subject to a terminal disclaimer.

(21) Appl. No.: 16/058,656

(22) Filed: Aug. 8, 2018

Related U.S. Application Data

(63) Continuation of application No. 14/487,692, filed on Sep. 16, 2014, now Pat. No. 10,062,147.

(51) Int. Cl.
*G06T 3/40* (2006.01)
*G06T 11/60* (2006.01)

(52) U.S. Cl.
CPC ............. *G06T 3/40* (2013.01); *G06T 11/60* (2013.01)

(58) Field of Classification Search
CPC combination set(s) only.
See application file for complete search history.

(56) References Cited

U.S. PATENT DOCUMENTS

| | | | |
|---|---|---|---|
| 6,426,751 B1 | 7/2002 | Patel et al. | |
| 6,456,305 B1 | 9/2002 | Qureshi et al. | |
| 7,257,776 B2 | 8/2007 | Bailey et al. | |
| 7,565,520 B2 | 7/2009 | Li | |
| 7,714,879 B2 | 5/2010 | Asai et al. | |
| 8,305,386 B2 | 11/2012 | Gillespie et al. | |
| 2004/0150645 A1 | 8/2004 | Burrell | |
| 2004/0230705 A1 | 11/2004 | Maciesowicz | |
| 2008/0049023 A1 | 2/2008 | Opstad | |
| 2010/0239160 A1* | 9/2010 | Enomoto | G06F 17/2205 382/165 |
| 2010/0277487 A1 | 11/2010 | Gillespie | |
| 2012/0017172 A1* | 1/2012 | Sheth | G06F 9/451 715/800 |
| 2014/0362104 A1* | 12/2014 | Hitchcock | G09G 5/06 345/593 |

OTHER PUBLICATIONS

USPTO Non Final Office Action dated Aug. 8, 2016 in U.S. Appl. No. 14/487,692, Scaling a Fixed Font Used by a Firmware Interface, first named inventor: Artem Shchygel, 8 pp.

USPTO Final Office Action dated Sep. 20, 2017 in U.S. Appl. No. 14/487,692, Scaling a Fixed Font Used by a Firmware Interface, first named inventor: Artem Shchygel, 10 pp.

* cited by examiner

*Primary Examiner* — Motilewa Good Johnson
(74) *Attorney, Agent, or Firm* — Newport IP, LLC

(57) ABSTRACT

Firmware interfaces scale a fixed-font utilized by the firmware interfaces to display glyphs of the fixed-font at a native resolution or a preferred resolution of a display. A conversion factor is generated for scaling the glyphs of the font using the native resolution or the preferred resolution. The glyphs may be scaled using the conversion factor. The scaled glyphs may be stored and utilized to display text of the firmware interface in the native resolution or the preferred resolution.

20 Claims, 4 Drawing Sheets

SCALING A FIXED FONT USED BY A FIRMWARE INTERFACE

CROSS REFERENCE TO RELATED APPLICATIONS

This application is a continuation of co-pending U.S. patent application Ser. No. 14/487,692 entitled "SCALING A FIXED FONT USED BY A FIRMWARE INTERFACE," which was filed on Sep. 16, 2014, and which is expressly incorporated herein by reference in its entirety.

BACKGROUND

Computer firmware interfaces may utilize fonts that are fixed in size for displaying text. The text that is displayed by a firmware interface may appear smaller on some displays and larger on other displays. For example, some displays may have higher resolutions that may accommodate the display of more glyphs as compared to displays that have lower resolutions.

It is with respect to these considerations and others that the disclosure made herein is presented.

SUMMARY

Concepts and technologies are described herein for fixed font scaling in a firmware interface. In order to enable this functionality, a native resolution or a preferred resolution of the display may be determined. In some displays, the native resolution or the preferred resolution of the display may be higher than a default resolution of the firmware interface. In this scenario, the fixed font of the firmware interface may appear smaller on a display of a higher resolution than when the fixed font is displayed using the default resolution of the firmware interface. Scaling the fixed font of the firmware interface may increase the size of the fixed font on the display having the higher resolution.

According to an aspect presented herein, a computer-implemented method may be provided for scaling glyphs of a font. The method may determine a resolution of a display connected to a computer executing a firmware interface. The resolution may be one or more of a native resolution or a preferred resolution. The method may include determining to scale the glyphs based at least in part on the resolution of the display and a default resolution associated with the firmware interface. A conversion factor may be generated and used to scale the glyphs. In some examples, the conversion factor may be based at least in part on the resolution of the display and the default resolution of the firmware interface. The method may also scale the glyphs using the conversion factor. Text generated by the firmware interface may be displayed in the resolution of the display utilizing the scaled glyphs.

According to another aspect, a computer-readable storage medium has computer-executable instructions which, when executed by a processor, may cause the processor to determine a resolution of a display connected to a computer executing a firmware interface. The resolution may be one or more of a native resolution or a preferred resolution. A determination to scale glyphs may be made based at least in part on the resolution of the display. A conversion factor for the glyphs may be generated using the resolution and a default resolution that is associated with the firmware interface. A determination may be made that the previously scaled glyphs are located in a storage device of the computer. In response to the previously scaled glyphs not being located in the storage device, the glyphs may be scaled using the conversion factor. Text generated by the firmware interface may be displayed in the resolution of the display utilizing the scaled glyphs.

According to yet another aspect, an apparatus is provided. The apparatus may include a processor and a memory communicatively coupled to the processor. The memory may store the firmware interface, which may execute from the memory. The apparatus may determine a resolution of a display coupled to the apparatus. The resolution may be one or more of a native resolution or a preferred resolution. The apparatus may also determine to scale the glyphs based at least in part on a comparison of the resolution of the display to a size of the glyphs. A conversion factor may be generated using a horizontal native resolution or a horizontal preferred resolution and a glyph scaling factor.

Additionally, the apparatus may determine that previously scaled glyphs are not stored in the memory. The apparatus may also scale the glyphs using the conversion factor to produce scaled glyphs. In some examples, the scaled glyphs may be stored in the memory. The apparatus may display text generated by the firmware interface in the resolution of the display utilizing the scaled glyphs.

It should be appreciated that the above-described subject matter may also be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the subject matter, nor is it intended that this Summary be used to limit the scope of the subject matter. Furthermore, the subject matter is not limited to implementations that solve any or all disadvantages noted in any part of this disclosure.

DETAILED DESCRIPTION

Figure 1:
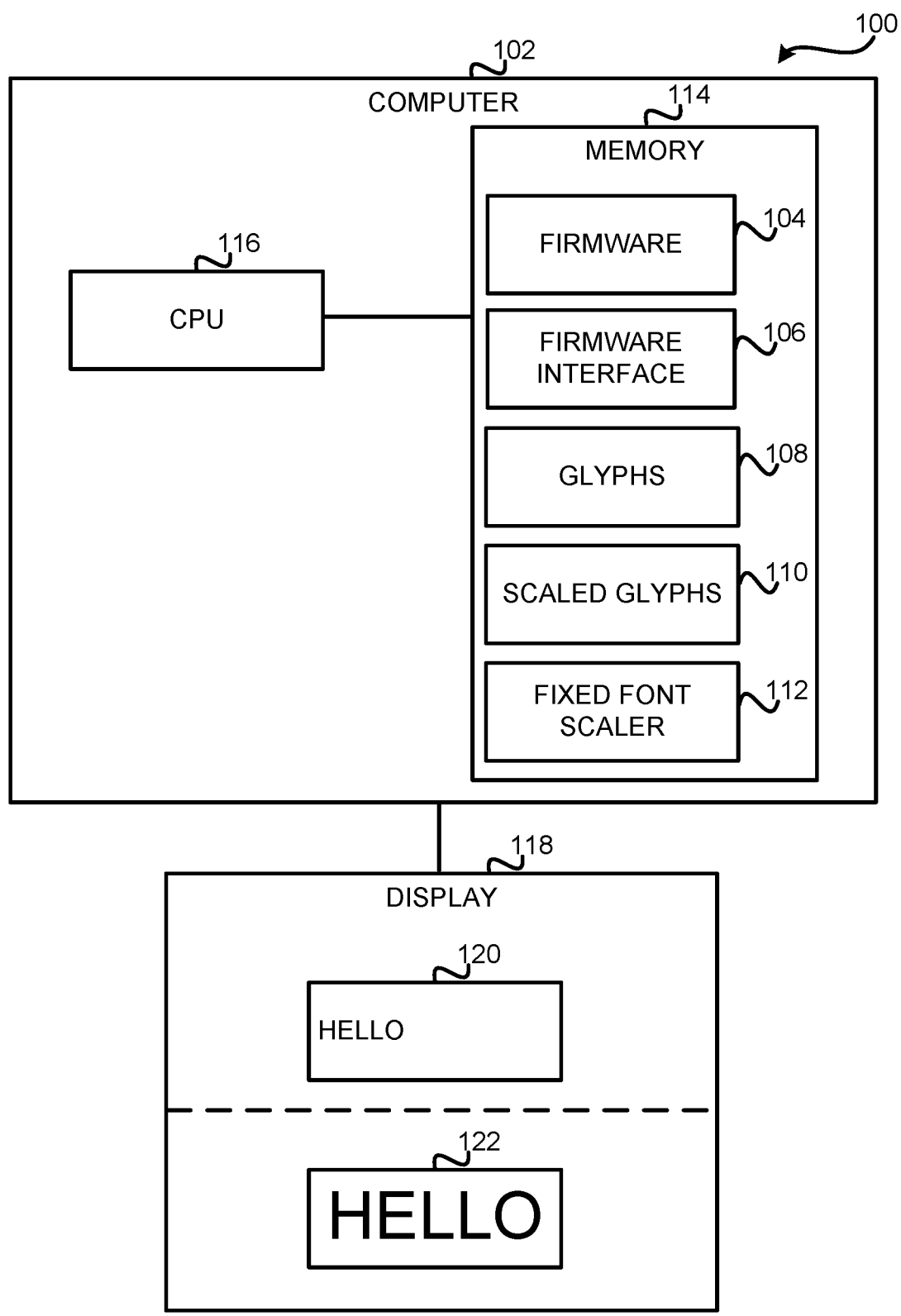
FIG. 1 is block diagram providing an overview of aspects of the embodiments presented herein for fixed font scaling in a firmware interface.

The following detailed description is directed to technologies for fixed font scaling in a firmware interface. The firmware interface may use glyphs of the same size to display characters of the fixed font. In some configurations, the firmware interface may use a default resolution to display text using the fixed font. In some cases, the default resolution used by the firmware interface may not be the same resolution as a native resolution of a display that is coupled to the firmware interface.

Displaying glyphs of a fixed font on a higher resolution display as compared to the default resolution of the firmware interface may result in text that appears smaller than desired. In some examples, the glyphs of the fixed font of the firmware interface are scaled such that when the firmware interface displays text, the display of the text is larger as compared to displaying the text using the glyphs that are not scaled. A firmware interface running on a computer may determine a preferred resolution or the native resolution of a display of the computer. The firmware interface may compare the preferred or native resolution of the display to the default resolution of the firmware interface to determine whether to scale the glyphs. For example, the glyphs may be determined to be scaled when the native resolution is some factor greater than the default resolution. Scaling the glyphs may allow the text displayed by the firmware interface to appear larger on the higher resolution of the display while still utilizing approximately the same number of glyphs as the default resolution of the firmware interface.

A conversion factor may be utilized to determine a ratio used to scale the glyphs. The conversion factor may be determined by comparing the preferred resolution of the display to the default resolution of the firmware interface. In other examples, the conversion factor may be determined using a user-defined setting. For example, an authorized user may set the conversion factor to two, which would double the size of the glyphs. The conversion factor may be defined as an integer or a whole number.

In some configurations, the firmware interface may utilize the conversion factor to scale the glyphs. The scaled glyphs may be displayed by the firmware interface utilizing the preferred or native resolution of the display. The scaled glyphs may also be stored for later use. For example, the firmware interface may utilize the scaled glyphs in storage without having to repeatedly scale the glyphs of the firmware interface.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks, transform data, or implement particular abstract data types. Moreover, those skilled in the art will appreciate that the subject matter described herein may be practiced with other computer system configurations, including hand-held devices, multi-processor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of bus enumeration acceleration will be described.

Turning now to FIG. 1, a fixed font scaling system 100 illustrates a computing system in which fixed font scaling may be performed, in accordance with embodiments disclosed herein. According to various embodiments, a computer 102 may contain a central processing unit ("CPU") 116. The CPU 116 is a central processor that performs arithmetic and logical operations necessary for the operation of the computer. The computer may include a multitude of CPUs 116 and each CPU 116 might include multiple processing cores.

The CPU 116, in turn, may be connected to a memory 114. The CPU 116 may be connected to the memory 114 via a bus (not shown). According to some embodiments, the memory 114 may be a read-only memory ("ROM"), flash memory including non-volatile random access memory ("NVRAM"). Alternatively, the memory 114 may be another type of memory.

The memory 114 may store a firmware 104 and a firmware interface 106. The firmware 104 might use the firmware interface 106 to boot the computer 102, load an operating system, display glyphs, as well as perform other functionality. The firmware interface 106 might be a Basic Input/Output System ("BIOS") interface, a Unified Extensible Firmware Interface ("UEFI"), an Open Firmware interface, or some other type of interface.

The memory 114 may also store a fixed font scaler 112. The fixed font scaler 112 may scale glyphs 108 that may comprise a fixed font of the firmware interface 106. The fixed font scaler 112 may scale the glyphs 108 so that the glyphs 108 may appear larger on a display 118. The display 118 may have a native or preferred resolution larger than a default resolution of the firmware interface 106. Without scaling, the display of the glyphs 108 on the display 118 at the default resolution of the firmware interface 106 may result in the glyphs 108 appearing small or difficult for some users to read as illustrated by the five unscaled glyphs 120.

Figure 2A:
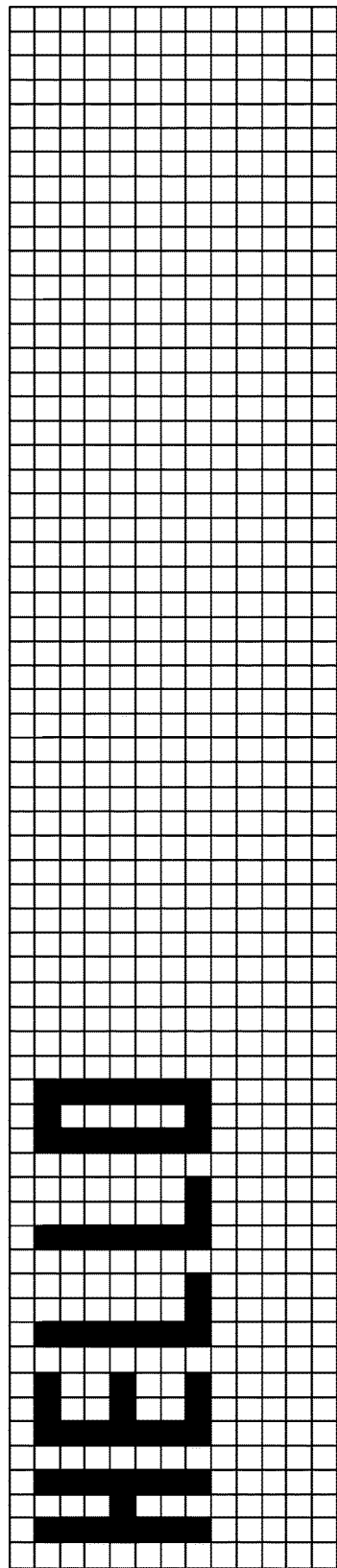
FIG. 2A is an illustration of a number of glyphs, that are not scaled.
Figure 2B:
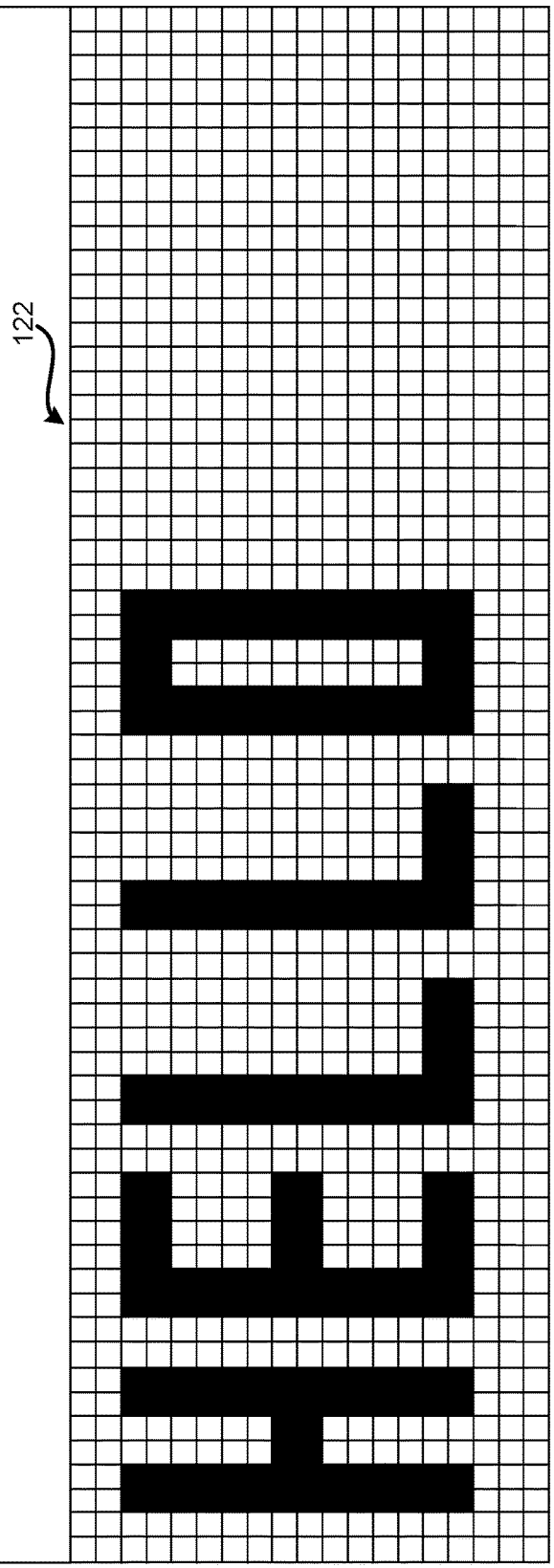
FIG. 2B is an illustration of the glyphs of FIG. 2A, that are scaled by a conversion factor of two.

The five unscaled glyphs 120, also shown in FIG. 2A, illustrates five glyphs displayed by the firmware interface 106 that are not scaled. Also shown on the display 118, are the five scaled glyphs 122. The five scaled glyphs 122 are also shown in FIG. 2B and discussed below. The display 118 illustrates that the fixed font scaler 112 may scale unscaled glyphs 108 by a conversion factor to produce the scaled glyphs 110. The display 118 illustrates that the scaled glyphs 110 may appear larger than the unscaled glyphs 108. In some embodiments, the display 118 may illustrate either the unscaled glyphs 108 or the scaled glyphs 110.

The fixed font scaler 112 may determine the native or preferred resolution of the display 118. In some examples, the fixed font scaler 112 may use the native or preferred resolution of the display 118 to generate the conversion factor. The fixed font scaler 112 may scale the unscaled glyphs 108 by the conversion factor to produce the scaled glyphs 110. In other embodiments, the conversion factor may be a user-defined setting. For example, as discussed briefly above, an authorized user may set a user-defined setting that sets the conversion factor to some specified value (e.g., 2, 3, 4). In some examples, the conversion factor may be defined as an integer or a whole number. The firmware interface 106 may employ different procedures to ensure this user-defined setting contains a valid number. As discussed further below, the conversion factor may be an integer. Therefore, the firmware interface 106 may employ procedures to ensure that the user-defined setting only accepts integers and does not accept fractional values.

Additionally, mechanisms may be utilized to display a minimum number of glyphs on a display. For example, a threshold value may be defined that may allow a minimum number of glyphs to appear on the display. In some configurations, the firmware interface 106 may accept values for the conversion factor which displays at least the threshold value of glyphs. When this threshold value is not reached, the firmware interface 106 may not permit such values to define the conversion factor. The scaled glyphs 110 may be utilized by the fixed font scaler 112 to display a scaled fixed font by the firmware interface 106.

The fixed font scaler 112 may also utilize the scaled glyphs 110 that are stored in memory 114 and may have been previously scaled to deliver the scaled glyphs 110 to the firmware interface 106. In some embodiments, the scaled glyphs 110 may be stored somewhere other than the memory 114, such as another memory of the computer 102. After determining that the unscaled glyphs 108 may need to be scaled, the fixed font scaler 112 may check the memory 114 to determine whether the scaled glyphs 110 exist for the conversion factor. When the scaled glyphs 110 are already located in the memory 114, the firmware interface 106 may utilize the scaled glyphs 110 to display a scaled fixed font. When the scaled glyphs 110 are not located in the memory 114, then the fixed font scaler 112 may scale the unscaled glyphs 108 and store the scaled glyphs 110 in memory 114.

Turning now to FIG. 2A, five unscaled glyphs 120 of a font are shown that may be displayed by a firmware interface 106. The glyphs in FIG. 2A are fixed-width, therefore each glyph occupies the same amount of space. In the illustrative embodiment of FIG. 2A, each glyph occupies a space 4 pixels wide (with the space) and 7 pixels high. In alternative embodiments, the size of the glyphs may be a different size.

In FIG. 2B, five glyphs 122 that have been scaled by a conversion factor of two are illustrated. The scaled glyphs of FIG. 2B are 8 pixels wide and 14 pixels high. If the conversion factor was three then the size of the scaled glyphs would be 12 pixels wide and 21 pixels high.

The conversion factor may be determined by dividing a horizontal resolution of a native resolution of a display by a glyph scaling factor. The default horizontal resolution of a firmware interface may be utilized as the glyph scaling factor. In some configurations, the glyph scaling factor is determined to maintain the same number of glyphs that fit horizontally into the default resolution of the firmware interface. For example, for purposes of explanation, and not intended to be limiting, assume that a default resolution of the firmware interface 106 in FIG. 2A is 800×640 pixels. The glyphs of FIG. 2A may be desired to be displayed in a native resolution of 1600×900 pixels for the display 118. Utilizing the horizontal resolution of the native resolution display (1600 pixels) and the glyph scaling factor (800 pixels) that is based on the default horizontal resolution of the firmware interface 106, a conversion factor of two may be generated. Scaling the glyphs of FIG. 2A by a factor of two results in the scaled glyphs of FIG. 2B. Alternatively, the conversion factor may be determined by dividing a vertical resolution of the native resolution by a glyph scaling factor, where the glyph scaling factor may be determined by a default vertical resolution of a firmware interface.

In some configurations, the conversion factor may be rounded to an integer. In FIG. 2A, each glyph is 7 pixels high. In some embodiments, the quotient may be rounded up to an integer. In other embodiments, the quotient may be rounded down to an integer. In other examples, as briefly described above, the conversion factor may be determined utilizing a user-defined setting.

Figure 3:
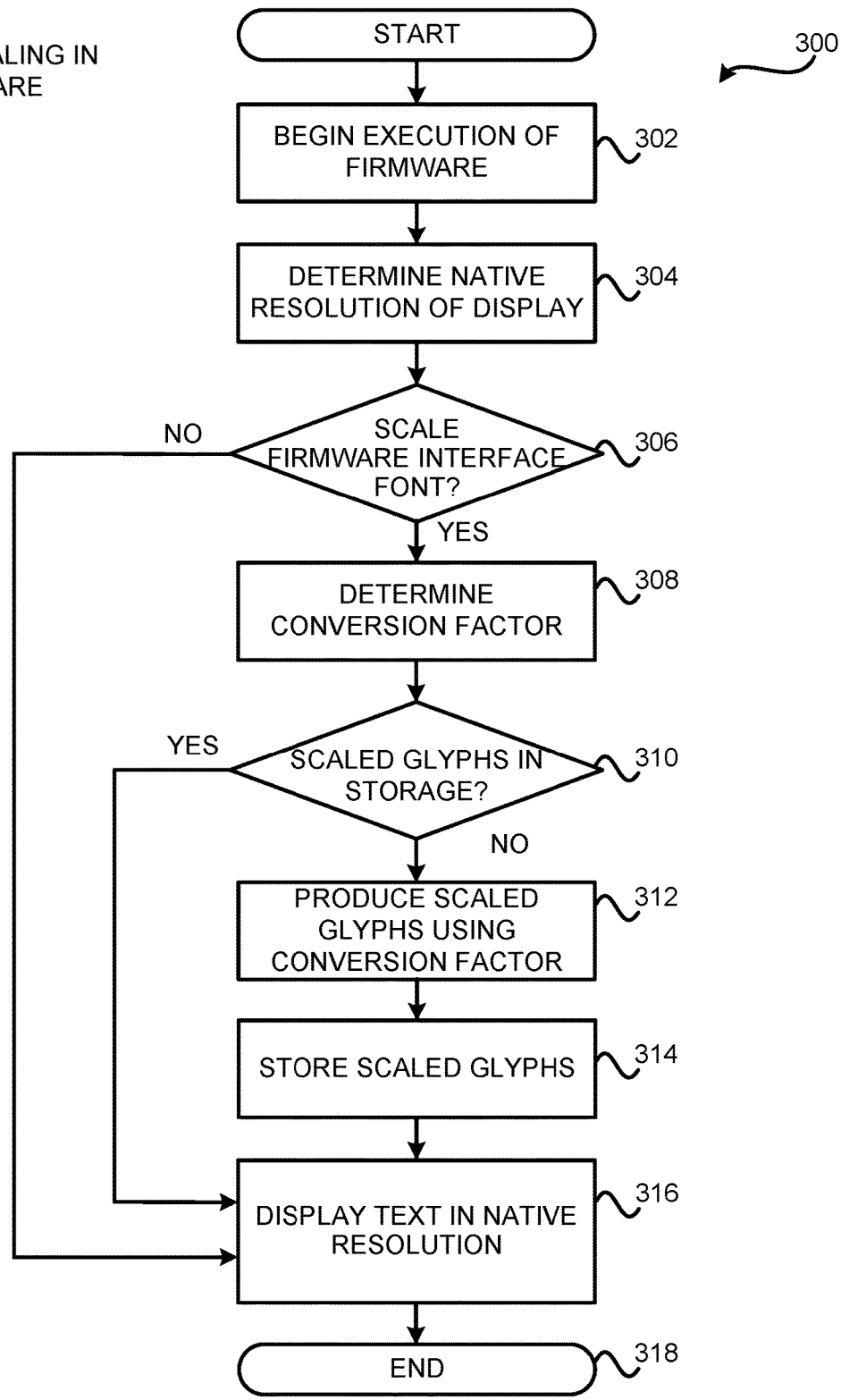
FIG. 3 is a flow diagram showing an illustrative routine for fixed font scaling in a firmware interface.

Turning now to FIG. 3, an illustrative routine 300 will be described that illustrates aspects for fixed font scaling that is associated with a firmware interface 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts and modules may be implemented in software, in firmware, in special purpose digital logic, and any combination thereof. It should be appreciated that more or fewer operations may be performed than shown in the figures and described herein. These operations may also be performed in parallel, or in a different order than those described herein.

The routine 300 may begin at operation 302, where the firmware 104 of a computer may begin execution. The firmware 104 may begin execution as a result boot. For example, the boot may start as a result of the computer being turned on. Alternatively, the boot may start as a result of a software command or by engaging a hardware switch. The firmware 104 may utilize a firmware interface 106 such as a Basic Input/Output System ("BIOS") interface, a Unified Extensible Firmware Interface ("UEFI"), an Open Firmware interface or another interface.

From operation 302 the routine 300 may proceed to operation 304. At operation 304, a native resolution of a display 118 of the computer may be determined. For Liquid Crystal Displays ("LCDs"), the native resolution may be a single fixed resolution of the LCD. If a resolution other than the native resolution is utilized on a LCD, then the LCD may interpolate the resolution to display it. Interpolation scales an image, which may cause a loss of image quality. As discussed above, for displays other than a LCD, a preferred resolution may be utilized for the native resolution.

From operation 304, the routine 300 may next proceed to operation 306. At operation 306, the routine 300 may determine whether to scale a font utilized by the firmware interface 106. In some examples, scaling may not be performed when the native resolution of the display 118 is similar to the default resolution of the firmware interface 106. For example, when the difference in the native resolution of the display 118 from the default resolution of the firmware interface 106 exceeds a specified threshold (e.g., 5%, 10%) then scaling may be performed. In some examples, the glyphs 108 of a fixed font are scaled by an integer and not by a fractional amount. When scaling is not performed then the routine 300 may continue to operation 316.

At operation 316, the glyphs 108 of the font may display text using the native or preferred resolution of the display 118. The glyphs 108 of the font may be individual characters of the font. From operation 316 the routine 300 may continue to an end operation 318.

In response to the determination to scale the font in the firmware interface 106 at operation 306 then the routine 300 may continue to operation 308. At operation 308, a conversion factor for the font may be determined by the fixed font scaler 112. In some examples, the glyphs 108 of the font may be fixed-width or mono-spaced, such that each glyph occupies the same size. In some embodiments, each glyph may be 8 pixels wide and 19 pixels high. The glyphs 108 that are 8 pixels wide and 19 pixels high may be described using 19 bytes, wherein each byte is composed of 8 bits and each bit describes a single pixel. When the conversion factor is two, then each of these scaled glyphs 110 may be 16 pixels wide and 38 pixels high. Also when the conversion factor is two, four pixels may be used to describe each pixel of the unscaled glyph. Each glyph may be described by 76 bytes when the conversion factor is two. Likewise when the conversion factor is three, then each of these scaled glyphs 110 may be 24 pixels wide and 57 pixels high and described by 171 bytes. Also, nine pixels may be used to describe each pixel of the unscaled glyph.

As discussed above, the conversion factor may be determined by dividing a horizontal resolution of the native resolution by a glyph scaling factor. The glyph scaling factor may be determined by determining a default horizontal resolution of the firmware interface 106. The glyph scaling factor may keep an approximately same number of glyphs that fit horizontally into the default resolution of the firmware interface 106. For example when the default resolution of the firmware interface 106 is 800×600 pixels, then 100 glyphs will fit in one line when each glyph is 8 pixels wide. In this example, the glyph scaling factor may be determined to be 800. As another example, when the default resolution of the firmware interface 106 is 640×480 pixels, then 80 glyphs 108 will fit in one line when each glyph is 8 pixels wide and the glyph scaling factor may be set to 640.

Alternately, the conversion factor may be determined by defining a threshold value for a maximum value of glyphs to be displayed. In the above example, when each glyph is 8 pixels wide and the resolution is 800×600 pixels, then a threshold of 100 glyphs may exist. The conversion factor may be determined by comparing a horizontal resolution of a native resolution to the threshold and the pixel width of the glyphs. In other embodiments, the conversion factor may be determined by comparing a vertical resolution of a native resolution to the pixel length of the glyphs and a threshold defining a maximum value of glyphs to be displayed from a vertical perspective.

If the native resolution of the display is 1600×900 pixels, then the horizontal resolution of the native resolution may be 1600 pixels. If the firmware interface 106 has a default resolution of 800×600 pixels then the conversion factor may be two. If the firmware interface 106 has a default resolution of 640×460 pixels then dividing 1600 pixels by 640 pixels equals 2.5. In some examples, the conversion factor may be rounded to an integer. In some embodiments 2.5 is rounded up and the conversion factor is three. Other embodiments may have the quotient rounded down to an integer. In this example, 2.5 is rounded down to two.

Alternatively, the conversion factor may be determined by dividing a vertical resolution of the native resolution by a glyph scaling factor, where the glyph scaling factor may be determined by a default vertical resolution of the firmware interface 106. In these alternative embodiments, the same number of glyphs that fit vertically into the default resolution of the firmware interface 106 may fit into the native resolution of the display. As discussed above, the conversion factor may be a user-defined setting. The firmware interface 106 may employ different procedures to ensure this user-defined setting contains a valid number, including ensuring that the user-defined setting only accepts integers and does not accept fractional values.

As mentioned above, other procedures may be utilized to ensure that a minimum number of glyphs may appear on a display at a resolution. In some embodiments, a threshold value may be defined that may allow a minimum number of glyphs to appear on the display. The firmware interface 106 may accept values for the conversion factor which display at least the threshold value of glyphs. When this threshold value is not reached, the firmware interface 106 may not permit such values to define the conversion factor.

Additionally in some embodiments, the display may not have a high resolution as compared to the default resolution of the firmware interface 106. In these embodiments, the conversion factor may be considered to be one. When the display does not have a high resolution as compared to the default resolution of the firmware interface 106, then no scaling of the glyphs 108 of the firmware interface 106 may occur. As discussed above in some embodiments, the firmware interface 106 may be associated with a default resolution of 800×600 pixels. If a preferred resolution of the display is 1024×768 pixels, then the horizontal resolution of the preferred resolution may be 1024 pixels. In these embodiments, determining the conversion factor by dividing the horizontal resolution of the preferred resolution of the display by the default horizontal resolution leads to a value of 1.28. In some examples, rounding the conversion factor to an integer may lead to a value of 1. In these embodiments, the firmware interface 106 may cause the glyphs 108 to be displayed without scaling.

The routine 300 may next proceed from operation 308 to operation 310. At operation 310, the routine 300 may determine whether the glyphs scaled by the conversion factor are in storage of the computer. As mentioned further below regarding FIG. 4, the scaled glyphs 110 may be stored in the memory 114, including flash memory or NVRAM.

In response to determining at operation 310 that the scaled glyphs 110 are located in storage, then the routine 300 may continue to operation 316. At operation 316, the scaled glyphs 110 of the font are retrieved from storage and may be used to display text using the native or preferred resolution on the display 118. From operation 316 the routine 300 may continue to operation 318 where the routine 300 ends.

In response to the determination that the scaled glyphs 110 are not located in storage at operation 310 then the routine 300 may continue to operation 312. At operation 312, the scaled glyphs 110 may be produced using the conversion factor from the fixed font scaler 112. As mentioned above, the conversion factor may be an integer. As shown above in FIGS. 2A and 2B, the number of pixels used to illustrate the scaled glyphs 110 as compared to unscaled glyphs 108 may be expressed as the square of the conversion factor. For example, when the conversion factor is two then four times as many pixels are needed to illustrate the scaled glyphs 110 as compared to glyphs 108 that are not scaled. Likewise, when the conversion factor is three, then nine times as many pixels are needed to illustrate the scaled glyphs 110 as compared to glyphs 108 that are not scaled.

The routine 300 may next proceed from operation 312 to operation 314. At operation 314, the routine 300 stores the scaled glyphs 110 that were scaled in operation 312. The scaled glyphs 110 may be stored in memory 114. In some embodiments, the scaled glyphs 110 may be stored in flash memory such as NVRAM. Other embodiments may have the scaled glyphs 110 stored elsewhere. Storing the scaled glyphs 110 may allow subsequent boots to utilize the scaled glyphs 110 without having to scale the glyphs 108 of the firmware interface 106.

The routine 300 may next proceed from operation 314 to operation 316. At operation 316, the scaled glyphs 110 of the font created in operation 312 may be used to display text from the firmware interface 106 utilizing the native resolution of the display 118. From operation 316 the routine 300 may continue to operation 318 where the routine 300 ends.

Additionally, it should be appreciated that the operations of routine 300 are not necessarily presented in any particular order and that performance of some or all of the operations in an alternative order(s) is possible. Operations in routine 300 may be added, omitted, and/or performed simultaneously, without departing from the scope of the claims.

Figure 4:
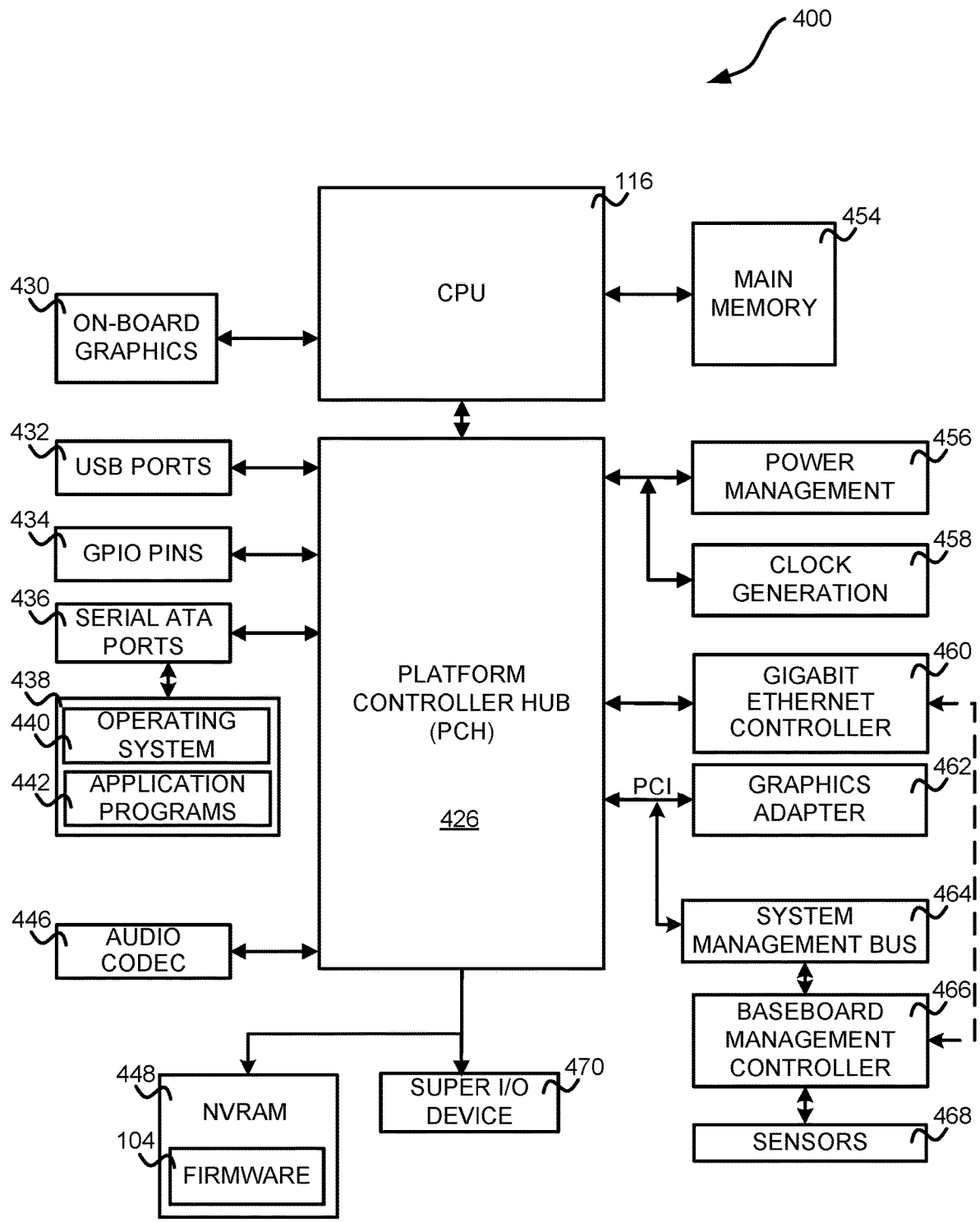
FIG. 4 is a computer architecture diagram showing an illustrative computer architecture that might be utilized to implement a computing system that embodies the various concepts and technologies presented herein.

Referring now to FIG. 4, a computer architecture diagram showing an illustrative computer architecture that might be utilized to implement a computing system that embodies the various concepts and technologies presented herein will be described. FIG. 4 and the following discussion are intended to provide a brief, general description of a suitable computing environment in which the embodiments described herein may be implemented. While the technical details are presented herein in the general context of program modules that execute in conjunction with the execution of an operating system, those skilled in the art will recognize that the embodiments may also be implemented in combination with other program modules.

Generally, program modules include routines, programs, components, data structures, and other types of structures that perform particular tasks or implement particular abstract data types. Moreover, those skilled in the art will appreciate that the embodiments described herein may be practiced with other computer system configurations, including handheld devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

In particular, FIG. 4 shows an illustrative computer architecture for a computer 400 that may be utilized in the implementations described herein. The illustrative computer architecture shown in FIG. 4 is for the computer 400 that includes a baseboard, or "motherboard", which is a printed circuit board to which a multitude of components or devices may be connected by way of a system bus or other electrical communication path. In one illustrative embodiment, a CPU 116 operates in conjunction with a Platform Controller Hub ("PCH") 426. The CPU 116 is a central processor that performs arithmetic and logical operations necessary for the operation of the computer 400. The computer 400 may include a multitude of CPUs 116. Each CPU 116 might include multiple processing cores.

The CPU 116 provides an interface to a random access memory ("RAM") used as the main memory 454 in the computer 400 and, possibly, to an on-board graphics adapter 430. The PCH 426 provides an interface between the CPU 116 and the remainder of the computer 400.

The PCH 426 may also be responsible for controlling many of the input/output functions of the computer 400. In particular, the PCH 426 may provide one or more universal serial bus ("USB") ports 432, an audio codec 446, a Gigabit Ethernet Controller 460, and one or more general purpose input/output ("GPIO") pins 434. The USB ports 432 may include USB 2.0 ports, USB 3.0 ports and USB 3.1 ports among other USB ports. The audio codec 446 may include Intel High Definition Audio, Audio Codec '97 ("AC'97") and Dolby TrueHD among others.

The PCH 426 may also include functionality for providing networking functionality through a Gigabit Ethernet Controller 460. The Gigabit Ethernet Controller 460 is capable of connecting the computer 400 to another computer via a network. Connections which may be made by the Gigabit Ethernet Controller 460 may include LAN or WAN connections. LAN and WAN networking environments are commonplace in offices, enterprise-wide computer networks, intranets, and the Internet.

The PCH 426 may also provide a bus for interfacing peripheral card devices such as a graphics adapter 462. In one embodiment, the bus comprises a PCI bus. The PCI bus may include a Peripheral Component Interconnect ("PCI") bus, a Peripheral Component Interconnect eXtended ("PCI-X") bus and a Peripheral Component Interconnect Express ("PCIe") bus among others.

The PCH 426 may also provide a system management bus 464 for use in managing the various components of the computer 400. Additional details regarding the operation of the system management bus 464 and its connected components are provided below. Power management circuitry 456 and clock generation circuitry 458 may also be utilized during the operation of the PCH 426.

The PCH 426 is also configured to provide one or more interfaces for connecting mass storage devices to the computer 400. For instance, according to an embodiment, the PCH 426 includes a serial advanced technology attachment ("SATA") adapter for providing one or more serial ATA ports 436. The serial ATA ports 436 may be connected to one or more mass storage devices storing an operating system and application programs, such as a SATA disk drive 438. As known to those skilled in the art, an operating system 440 comprises a set of programs that control operations of a computer and allocation of resources. An application program 442 is software that runs on top of the operating system software 440, or other runtime environment, and uses computer resources to perform application specific tasks desired by the user.

According to one embodiment of the invention, the operating system 440 comprises the LINUX operating system. According to another embodiment of the invention the operating system 440 comprises the WINDOWS SERVER operating system from MICROSOFT CORPORATION. According to another embodiment, the operating system 440 comprises the UNIX operating system. It should be appreciated that other operating systems may also be utilized.

The mass storage devices connected to the PCH 426, and their associated computer-readable storage media, provide non-volatile storage for the computer 400. Although the description of computer-readable storage media contained herein refers to a mass storage device, such as a hard disk or CD-ROM drive, it should be appreciated by those skilled in the art that computer-readable storage media can be any available media that can be accessed by the computer 400.

By way of example, and not limitation, computer-readable storage media may comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 400.

A low pin count ("LPC") interface may also be provided by the PCH 426 for connecting a Super I/O device 470. The Super I/O device 470 is responsible for providing a number of input/output ports, including a keyboard port, a mouse port, a serial interface, a parallel port, and other types of input/output ports. The LPC interface may also connect a computer storage media such as a ROM or a flash memory such as a NVRAM 448 for storing firmware 104 that includes program code containing the basic routines that help to start up the computer 400 and to transfer information between elements within the computer 400. The firmware 104 may utilize a firmware interface 106 such as a BIOS interface, a Unified Extensible Firmware Interface ("UEFI"), an Open Firmware interface or another interface. As mentioned above regarding FIG. 3, the scaled glyphs may be stored in NVRAM 448 or another type of flash memory.

As described briefly above, the PCH 426 may include a system management bus 464. The system management bus 464 may include a Baseboard Management Controller ("BMC") 466. In general, the BMC 466 is a microcontroller that monitors operation of the computer 400. In a more specific embodiment, the BMC 466 monitors health-related aspects associated with the computer 400, such as, but not limited to, the temperature of one or more components of the computer 400, speed of rotational components (e.g., spindle motor, CPU Fan, etc.) within the computer 400, the voltage across or applied to one or more components within the computer 400, and the available and/or used capacity of memory devices within the computer 400. To accomplish these monitoring functions, the BMC 466 is communicatively connected to one or more components by way of the system management bus 464.

In an embodiment, these components include sensor devices 468 for measuring various operating and performance-related parameters within the computer 400. The sensor devices 468 may be either hardware or software based components configured or programmed to measure or detect one or more of the various operating and performance-related parameters.

The BMC 466 functions as the master on the system management bus 464 in most circumstances, but may also function as either a master or a slave in other circumstances. Each of the various components communicatively connected to the BMC 466 by way of the system management bus 464 is addressed using a slave address. The system management bus 464 is used by the BMC 466 to request and/or receive various operating and performance-related parameters from one or more components, which are also communicatively connected to the system management bus 464.

It should be appreciated that the computer 400 may comprise other types of computing devices, including handheld computers, embedded computer systems, personal digital assistants, and other types of computing devices known to those skilled in the art. It is also contemplated that the computer 400 may not include all of the components shown in FIG. 4, may include other components that are not explicitly shown in FIG. 4, or may utilize an architecture completely different than that shown in FIG. 4.

Based on the foregoing, it should be appreciated that technologies for fixed font scaling in firmware interfaces are presented herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes may be made to the subject matter described herein without following the example embodiments and applications illustrated and described, and without departing from the true spirit and scope of the present invention.

What is claimed is:

1. A computer-implemented method, comprising:
   determining, by a computing device, a resolution of a display device connected to the computing device, the resolution including a horizontal resolution and a vertical resolution;
   determining, by the computing device, to scale glyphs of a font based at least in part on the resolution and a conversion factor to scale the glyphs, wherein the determining comprises comparing the resolution to a default resolution of a firmware interface of the computing device;
   generating, by the computing device, the conversion factor by, at least, dividing the horizontal resolution by a default horizontal resolution associated with the default resolution of the firmware interface of the computing device or dividing the vertical resolution by a default vertical resolution associated with the default resolution of the firmware interface; and
   scaling, by the computing device, the glyphs using the conversion factor.

2. The computer-implemented method of claim 1, further comprising causing a display device to present text generated by the computing device in the resolution of the display device utilizing the scaled glyphs.

3. The computer-implemented method of claim 2, wherein the generating the conversion factor comprises one of rounding a first result of dividing the horizontal resolution by the default horizontal resolution to a first integer or rounding a second result of dividing the vertical resolution by the default vertical resolution.

4. The computer-implemented method of claim 1, wherein the determining to scale the glyphs comprises determining that the resolution is greater than one or the default horizontal resolution or the default vertical resolution.

5. The computer-implemented method of claim 1, further comprising:
   determining that second scaled glyphs are located in a storage device, wherein the second scaled glyphs correspond to the resolution of the display device;
   retrieving the second scaled glyphs from the storage device; and
   utilizing the second scaled glyphs to display text.

6. The computer-implemented method of claim 1, further comprising storing, by the computing device, the scaled glyphs in a storage device.

7. The computer-implemented method of claim 1, further comprising generating, by the computing device, a second conversion factor that maintains a number of the scaled glyphs that fit horizontally into the default horizontal resolution.

8. A computer-readable non-transitory storage medium, having computer-executable instructions stored thereupon that, in response to execution, cause a processor to:
   determine a resolution of a display device, the resolution comprises a horizontal resolution and a vertical resolution;
   determine to scale glyphs of a font based at least in part on the resolution and a conversion factor to scale the glyphs, wherein determining to scale the glyphs comprises comparing the resolution to a default resolution of a firmware interface executed by the processor;
   generate the conversion factor by, at least, dividing the horizontal resolution by a default horizontal resolution associated with the default resolution of the firmware interface or dividing the vertical resolution by a default vertical resolution associated with the default resolution of the firmware interface; and scale the glyphs using the conversion factor to produce scaled glyphs.

9. The computer-readable non-transitory storage medium of claim 8, wherein the computer-executable instructions, in response to execution, further cause the processor to cause a display device to present text in the resolution utilizing the scaled glyphs.

10. The computer-readable non-transitory storage medium of claim 9, wherein the computer-executable instructions, in response to execution, further cause the processor to generate a second conversion factor that maintains a number of the scaled glyphs that fit horizontally into the default horizontal resolution.

11. The computer-readable non-transitory storage medium of claim 8, wherein the computer-executable instructions, in response to execution, further cause the processor to:

determine that second scaled glyphs are located in a storage device;

retrieve the second scaled glyphs from the storage device; and cause a display device to present second text in the resolution utilizing the second scaled glyphs.

12. The computer-readable non-transitory storage medium of claim 8, wherein to determine to scale the glyphs, the computer-executable instructions, in response to execution, further cause the processor to determine that the resolution of the display device exceeds a threshold resolution, wherein the threshold resolution is based at least in part on a minimum number of glyphs to be displayed.

13. The computer-readable non-transitory storage medium of claim 8, wherein to generate the conversion factor, the computer-executable instructions, in response to execution, further cause the processor to round a first result of dividing the horizontal resolution by the default horizontal resolution to a first integer or to round a second result of dividing the vertical resolution by the default vertical resolution to a second integer.

14. The computer-readable non-transitory storage medium of claim 8, wherein the computer-executable instructions, in response to execution, further cause the processor to cause the scaled glyphs to be stored in a storage device.

15. An apparatus, comprising:

a processor; and a memory device communicatively coupled to the processor storing a firmware interface that, in response to execution by the processor, causes the apparatus at least to determine a resolution of a display device coupled to the apparatus, wherein the resolution includes a horizontal resolution and a vertical resolution;

determine to scale glyphs based at least in part on a comparison of the resolution of the display device to a size of the glyphs, wherein determining to scale the glyphs comprises comparing the resolution to a default resolution of a firmware interface of the apparatus;

generate a conversion factor by, at least, dividing the horizontal resolution by a default horizontal resolution associated with the default resolution of the firmware interface or dividing the vertical resolution by a default vertical resolution associated with the default resolution of the firmware interface; and scale the glyphs using the conversion factor to produce scaled glyphs.

16. The apparatus of claim 15, wherein the firmware interface, in response to execution, further causes the apparatus to store the scaled glyphs in the memory device.

17. The apparatus of claim 16, wherein the font includes a fixed-width font, each one of the glyphs having a width spanning a same defined number of pixels and a height spanning a same second defined number of pixels and wherein each glyph in the fixed-width font is defined by a series of bits, each bit describing a pixel, wherein scaling the glyphs using the conversion factor includes describing each unscaled pixel with a number of bits equal to multiplying the conversion factor by itself, and wherein the scaled glyph has a converted width of the conversion factor multiplied by the width and a converted height of the conversion factor multiplied by the height.

18. The apparatus of claim 15, wherein the firmware interface, in response to execution, further causes the apparatus to direct a display device to present text in the resolution of the display utilizing the scaled glyphs.

19. The apparatus of claim 15, wherein the firmware interface, in response to execution, further causes the apparatus to:

generate a second conversion factor using a user-defined setting that does not exceed a threshold resolution including a defined number of glyphs to be displayed on a display device; and scale the glyphs using the second conversion factor.

20. The apparatus of claim 15, wherein the firmware interface, in response to execution, further causes the apparatus to:

determine that second scaled glyphs are in the memory device;

retrieve the second scaled glyphs from the memory device; and display second text in the resolution of the display utilizing the second scaled glyphs.

\* \* \* \* \*